H. D. NATERMAN.
VEHICLE BUMPER.
APPLICATION FILED JUNE 6, 1921.

1,409,462. Patented Mar. 14, 1922.

Inventor
Henry D. Naterman.
by
Edward A. Thomas
Atty.

UNITED STATES PATENT OFFICE.

HENRY D. NATERMAN, OF LOS ANGELES, CALIFORNIA, ASSIGNOR OF ONE-HALF TO FRANK E. WINSHIP, OF RIVERSIDE, CALIFORNIA.

VEHICLE BUMPER.

1,409,462.

Specification of Letters Patent. Patented Mar. 14, 1922.

Application filed June 6, 1921. Serial No. 475,255.

*To all whom it may concern:*

Be it known that I, HENRY D. NATERMAN, a citizen of the United States, residing at Los Angeles, in the county of Los Angeles, State of California, have invented new and useful Improvements in Vehicle Bumpers, of which the following is a specification.

My invention relates to vehicle bumpers, particularly adapted to be secured to the body of an automobile and to project forward therefrom, in order to protect the vehicle from damage when striking against another object, as well as to prevent persons from becoming entangled in the wheels and working mechanism of the vehicle when struck by the same.

The object of my invention is to provide a bumper of a resilient nature which will be simple of construction and which may be readily applied to the vehicle, said bumper being adapted to yield and have a cushioning effect when it comes in contact with another object; thus affording protection to the vehicle and to the occupants thereof against shock, as well as minimizing the blow and shock sustained by a person who may be struck thereby.

Another object of my invention is to provide a bumper which will readily resume its normal position after being relieved of the pressure incidental to its coming in contact with an object.

Other objects will be more fully disclosed in the following description, will be pointed out in the claims, and will be embodied in the accompanying drawings, in which:

Figure 1:
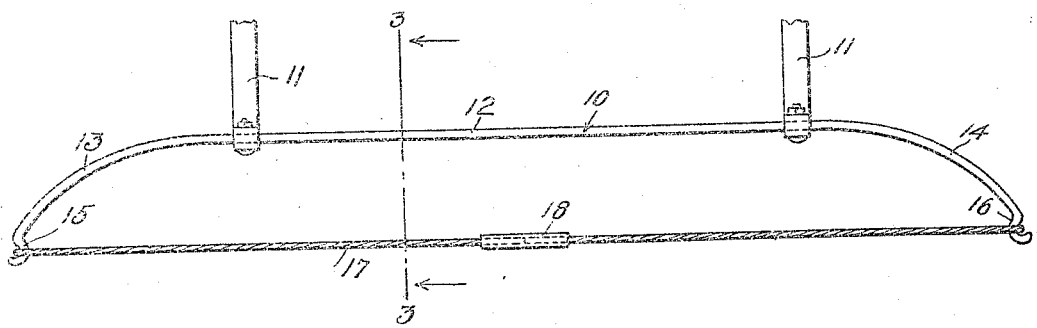
Fig. 1 is a plan view of my bumper device.
Figure 2:
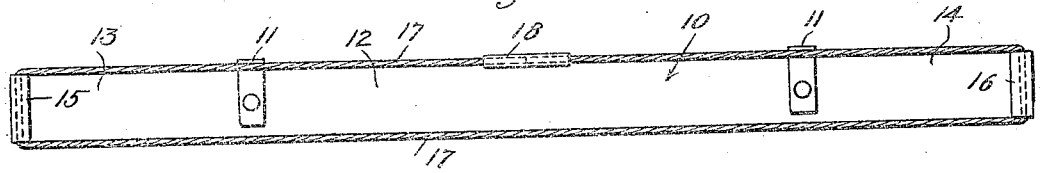
Fig. 2 is a front view of the same.
Figure 3:
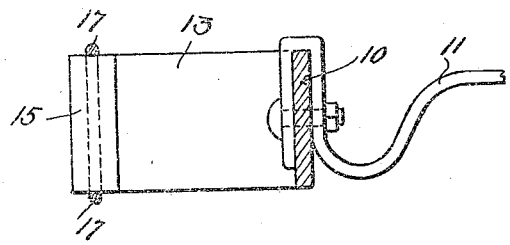
Fig. 3 is an enlarged transverse section taken on the line 3—3 of Fig. 1.

In carrying out my invention 10 represents a bow member which is preferably formed of spring strap metal and is adapted to be secured to the front of a vehicle (not shown) by means of the cleats 11 of any desired construction. The cleats 11 are spaced suitably apart and are secured to the straight part 12 of the bow as shown in Fig. 1. The ends of the bow are curved forwardly as at 13 and 14 and terminate in hooks 15 and 16.

Figure 4:
Fig. 4 is a sectional view illustrating one method of joining the ends of the continuous cable to form the band comprising one element of my invention.

A flexible band 17 preferably in the form of a wire cable or hemp rope, is adapted to pass over the hooks 15 and 16 and to be stretched taut by means of the resilient bow ends 15 and 16. The flexible band 17 may be conveniently formed by welding the ends of the cable into a sleeve 18 as clearly shown in Fig. 4 of the drawings.

By the foregoing recited construction it will be seen that the flexible band 17 is arranged forward of the bow member 10, and when it comes in contact with any object it will yield rearwardly against the resilient action of the bow ends 13 and 14, thus forming an efficient cushion to absorb the shock, thus reducing to a minimum, damage both to the object encountered and to the vehicle. If either of the ends of the bow 15 or 16 encounters the object, the encountering end will yield rearwardly and the opposite end will be drawn forwardly to divide the strain, and when the pressure is released from the bumper all of the elements will immediately resume a normal position. By arranging the bumper, with respect to the vehicle, so that the ends 13 and 14 of member 10 curve outwardly, it will be seen that all danger of these ends becoming hooked into an object will be obviated.

What I claim is:

1. A vehicle bumper, comprising a resilient bow member having a flexible endless band member attached thereto and stretched between its ends.

2. A vehicle bumper, comprising a resilient bow member formed with a hook on each of its ends, and a flexible endless band member passing over said hooks and disposed between said hooks.

3. A vehicle bumper, comprising a resilient bow member, having an endless cable stretched between its ends, and means for securing said bow member to a vehicle.

In witness that I claim the foregoing I have hereunto subscribed my name this 4th day of May, 1921.

H. D. NATERMAN.